Nov. 19, 1957 A. C. COUTANT ET AL 2,813,924

COAXIAL HEAD ARRANGEMENT FOR RECORDING LATENT IMAGES
ON A MAGNETIC FILM AND VISIBLY REPRODUCING THE SAME

Filed Dec. 7, 1951 2 Sheets-Sheet 1

Inventors.
Andre Clement Coutant
Jacques Mathot
By
Hunkerath, Lind + Ponack
Attorneys.

Nov. 19, 1957 A. C. COUTANT ET AL 2,813,924

COAXIAL HEAD ARRANGEMENT FOR RECORDING LATENT IMAGES ON A MAGNETIC FILM AND VISIBLY REPRODUCING THE SAME

Filed Dec. 7, 1951 2 Sheets-Sheet 2

Inventors.
Andre Clement Coutant
Jacques Mathot
By
Shenderoth, Lind + Ponack
Attorneys.

United States Patent Office 2,813,924
Patented Nov. 19, 1957

2,813,924

COAXIAL HEAD ARRANGEMENT FOR RECORDING LATENT IMAGES ON A MAGNETIC FILM AND VISIBLY REPRODUCING THE SAME

André Clément Coutant and Jacques Mathot, Paris, France

Application December 7, 1951, Serial No. 260,538

Claims priority, application France December 7, 1950

1 Claim. (Cl. 178—6.6)

Various methods have already been proposed of recording latent pictures by spots on a magnetic surface and of reproducting them by spots as visible images.

The recording and the detection or reading may be carried out by spots just the same as they are in TV; thus, each image may be analyzed into 400 lines each of 500 spots, which means that where 25 images are to be recorded or flashed per second as many as five million spots have to be dealt with per second whether the latent image is to be recorded or visibly reproduced; such a tremendously high periodicity lays down difficult problems which the method and the apparatus according to our invention are intended to resolve.

The method consists in moving, across the surface on which the image is to be recorded or from which said image is to be visibly reproduced, and in that direction in which the lines are recorded, magnetic heads the effective portion of which has a size equal to that of one spot, and this, at a speed consistent with the recording and reproducing possiblities of the device, the heads being spaced from one another an amount corresponding to the length of one line and each magnetic head becoming operative as soon as the one next ahead has completed the recording or the scanning of a line, and in causing such a relative displacement to occur within the time necessary for a magnetic head to sweep the length of one line that a further line is recorded (or scanned) by the next magnetic head, each head being conductively connected, for the time it is operative, with the means for spot-analyzing or -synthesizing the image considered.

Thus, in a particularly simple embodiment of our invention, heads spaced from one another an amount equal to the length of one line are arranged in the rim of a flywheel which is so dimensioned that the speed at which they sweep the magnetic surface is consistent with an admissible rotational speed; for instance, where the flywheel carries 100 heads, its diameter must be in the neighborhood of 60 cm. in order that the spacing of said heads may be equal to the length of a 18 mm. line; the rotational speed must then be 6,000 R. P. M. where 400 lines have to be recorded or read within $1/25$ of a second, and the magnetic film must be fed or moved along in a direction at right angles to the lines an amount equal to the height of one line during the time necessary for a head to sweep or scan a line.

Where one single wheel equipped with one single row of magnetic heads is insufficient to deal with the recording or the reproduction of a whole image, a plurality of flywheels carrying as many rows of magnetic heads adapted each to deal with a definite portion of the image concerned may be used. Thus, where four flywheel sections are used each of which carries 100 heads arranged at intervals equal to the length of one line and where each row is offset relative to the next one an amount equal to $4n+1$ lines, it becomes possible to rotate them four times slower than in the case just considered, i. e. at 1,500 R. P. M., when the magnetic film has to be moved along a length equal to four times the height of a line within the time necessary for each head to sweep a whole line; said flywheel sections may be connected with a multi-cell mosaic each section of which may correspond to the whole height of the image, yet only to a particular spot in each line; the successive columns providing each a section of the mosaic are connected to the successive flywheels, each wheel being connected to every fourth column.

Figure 6:
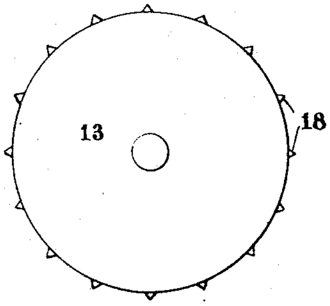
Figure 7:
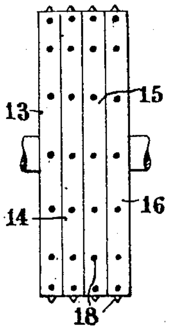
Figure 8:
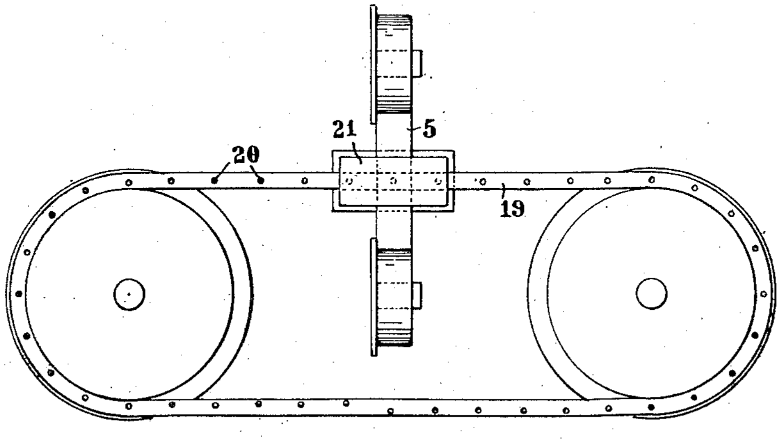

Figures 6, 7 and 8 relate to modifications.

Figure 1:
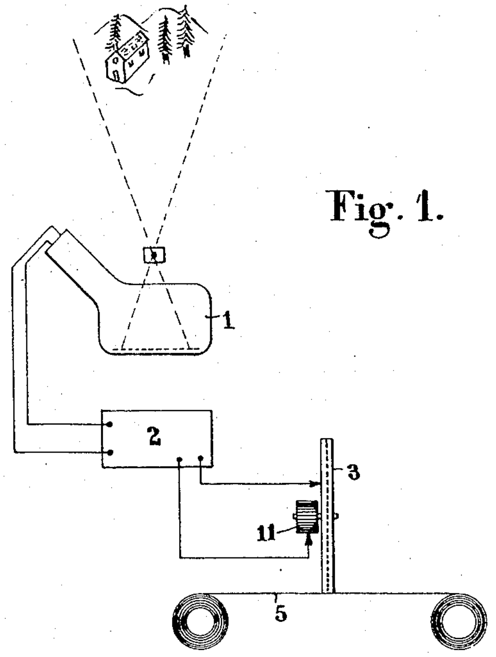
Figure 1 is a diagrammatical view of a recording or reproducing set.
Figure 2:
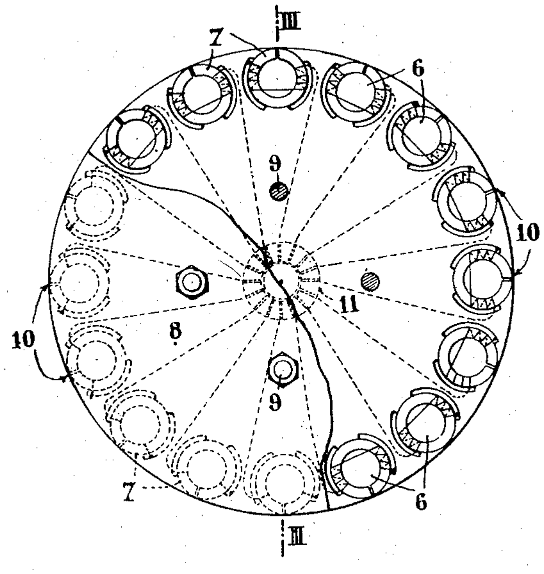
Figure 2 is a longitudinal sectional view of the magnetic head carrying flywheel.
Figure 3:
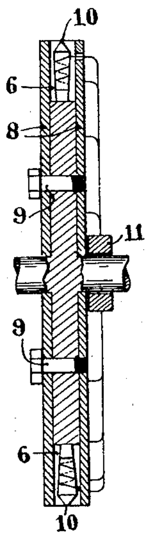
Figure 3 is a cross-sectional view taken on line III—III in Figure 2.

The picture-recording or -reproducing set shown in Fig. 1 includes an apparatus 1 for the analysis or for the synthesis according to which of these operations is to be done; said apparatus is conductively connected to an amplifier 2 which in its turn is connected to the flywheel 3 which is mounted with its axis parallel to the direction of travel of the magnetic film 5.

Said flywheel is formed in its rim with carefully calibrated circular recesses in which magnetic heads are locked which may be retained sidewise by a pair of cheeks 8 braced to each other by means of bolts 9; they are formed with a cone-shaped effective portion which is equal in size to the diameter of a spot; with this end in view, the width of their air gaps is equal to the height of a line.

Figure 4:
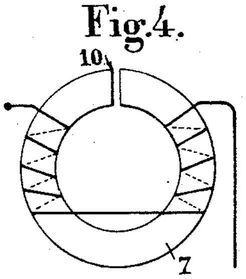
Figures 4 and 5 are elevational views of a magnetic head.
Figure 5:
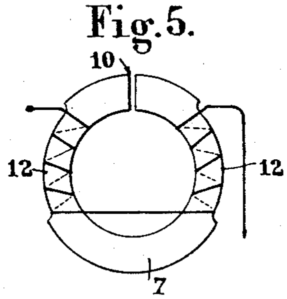

The windings of said magnetic heads are conductively connected to the collector; the magnetic plates may be piled together to substantially toric shape as shown in Fig. 4; preferably however, the pile is recessed as shown at 12 in Fig. 5 so that sufficient space is provided for the accommodation of the windings in order that same cannot interfere with a tight fitting of the magnetic head in its housing in the wheel rim.

In the modification illustrated in Figs. 6 and 7 the flywheel is quadruple; the flywheel sections 13, 14, 15, 16 are arranged e. g. at intervals of 17 lines; assigned to section 14 of the flywheel is the recording (or the reading) of lines 1, 5, 9, 13, 17, and so on; to section 15 that of lines 2, 6, 10, 14, 18, and so on; to section 16 that of lines 3, 7, 11, 15, 19, and so on; to section 17 that of lines 4, 8, 12, 16, 20, and so on; it being assumed that each section of the flywheel is fitted with 100 magnetic heads 18 arranged at intervals equal to the length of one line, each section of the flywheel will read 100 lines at each revolution of the whole flywheel, so that the latter as a whole will read a total of 400 lines; in order that said lines shall not overlap one another it is necessary that the relative displacement of the magnetic film and the flywheel sections in a direction at right angles to the lines should be equal to four times the height of one line within the time taken to record or read one line.

In combination with such a quadruple flywheel there may be used a multi-cell mosaic which preferably should be divided into columns having a breadth equal to the diameter of one spot; columns 1, 5, 9 are connected with flywheel section 13; columns 2, 6, 10 are connected with flywheel section 14; columns 3, 7, 11 are connected with flywheel section 15; columns 4, 8, 12 are connected with flywheel section 16; so that for the analysis of one 500-spot line each section of the flywheel has to deal with no more than one fourth of the whole line, i. e. 125 spots; it is not until four lines have been analyzed that each section of the flywheel will have recorded a full line.

It is also possible to use an ordinary cell in combination with a rotary distributor adapted to successively transmit the impulses collected through or by the four flywheel sections.

It is to be understood that the various embodiments of our invention have been described for the mere purpose of exemplification and by no means of limitation; thus, for the reading of a record taken on a magnetic film, a flexible rubber band 19 instead of a flywheel may be used on the one face of which magnetic heads 20 are arranged in helices at intervals equal to the length of one line, each helix being offset an amount equal to the height of one line relative to the next one considering the direction of travel of the film, which also is the one in which the lines are scanned; contact between said heads and the magnetic surface to be swept may be ensured with the aid of a resilient press plate 21.

What we claim is:

A device for recording latent images on a magnetic surface and visibly reproducing the same which comprises a flywheel composed of a plurality of coaxial sections displaced relative each to the next one by an amount equal to the height of one line multiplied by an integral multiple of the number of flywheel sections plus one, each of said flywheel sections carrying radial heads whose effective portion is equal in size to one spot and which are distributed over the rim of the said flywheel at intervals equal each to the length of one line, means to rotate said flywheel in such a manner that each successive head will scan one of the successive lines of the magnetic image to be recorded or reproduced and means to move the magnetic surface relative to the flywheel at right angles to the direction of the lines an amount equal to the height of one line multiplied by the number of flywheel sections within the time necessary for one head to sweep the length of one line.

References Cited in the file of this patent

UNITED STATES PATENTS

| | | |
|---|---|---|
| 1,974,911 | Buecher | Sept. 25, 1934 |
| 2,245,286 | Marzocchi | June 10, 1941 |
| 2,352,023 | Schuller | June 20, 1944 |
| 2,517,808 | Sziklai | Aug. 8, 1950 |